(12) United States Patent
Kowalchuk et al.

(10) Patent No.: US 9,392,741 B2
(45) Date of Patent: *Jul. 19, 2016

(54) VARIABLE GEOMETRY METER ROLLER

(71) Applicant: CNH Canada, Ltd., Saskatoon (CA)

(72) Inventors: Trevor Lawrence Kowalchuk, Saskatoon (CA); Jack Donald Turner, Saskatoon (CA); Gordon Anthony Engel, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,440

(22) Filed: Dec. 3, 2013

(65) Prior Publication Data

US 2014/0083343 A1 Mar. 27, 2014

Related U.S. Application Data

(60) Division of application No. 13/071,812, filed on Mar. 25, 2011, now Pat. No. 8,601,962, which is a continuation of application No. 13/045,280, filed on Mar. 10, 2011, now Pat. No. 8,671,857.

(51) Int. Cl.
| | |
|---|---|
| *A01C 7/20* | (2006.01) |
| *A01C 7/12* | (2006.01) |
| *A01C 7/02* | (2006.01) |
| *A01C 7/08* | (2006.01) |

(52) U.S. Cl.
CPC . *A01C 7/20* (2013.01); *A01C 7/081* (2013.01); *A01C 7/121* (2013.01); *A01C 7/126* (2013.01); *A01C 7/127* (2013.01)

(58) Field of Classification Search
CPC ............ A01C 7/20; A01C 7/00; A01C 7/121; A01C 7/12; A01C 7/08; A01C 7/127; A01C 7/081; A01C 7/126; A01C 7/712
USPC .................. 111/178, 177, 171, 170
See application file for complete search history.

(56) References Cited

U.S. PATENT DOCUMENTS

| | | | |
|---|---|---|---|
| 3,636,897 | A | 1/1972 | Brink |
| 3,790,026 | A | 2/1974 | Neumeister |
| 3,912,122 | A | 10/1975 | Knapp et al. |
| 3,913,798 | A | 10/1975 | Allen |
| 4,473,016 | A | 9/1984 | Gust |
| 5,024,173 | A | 6/1991 | Deckler |
| 5,189,965 | A | 3/1993 | Hobbs et al. |
| 5,549,060 | A | 8/1996 | Schick et al. |
| 5,601,209 | A | 2/1997 | Barsi et al. |
| 5,655,468 | A | 8/1997 | Ledermann et al. |
| 5,924,370 | A | 7/1999 | Gregor et al. |
| 5,947,040 | A | 9/1999 | Gregor |
| 5,996,515 | A | 12/1999 | Gregor et al. |
| 6,240,861 | B1 | 6/2001 | Memory |
| 6,598,548 | B2 | 7/2003 | Lempriere |
| 6,928,940 | B2 | 8/2005 | Soun |
| 7,311,050 | B2 | 12/2007 | Eastin et al. |
| 2005/0217551 | A1 | 10/2005 | Mayerle |
| 2008/0163807 | A1 | 7/2008 | Dean et al. |
| 2009/0314191 | A1 | 12/2009 | Friggstad |

*Primary Examiner* — Christopher J Novosad

(74) *Attorney, Agent, or Firm* — Rebecca L. Henkel

(57) ABSTRACT

An agricultural metering device with a variable geometry meter roller is provided. The agricultural metering device includes a meter roller having a plurality of flutes. An aggregate cross sectional area of the flutes increases along a longitudinal axis of the meter roller.

20 Claims, 6 Drawing Sheets

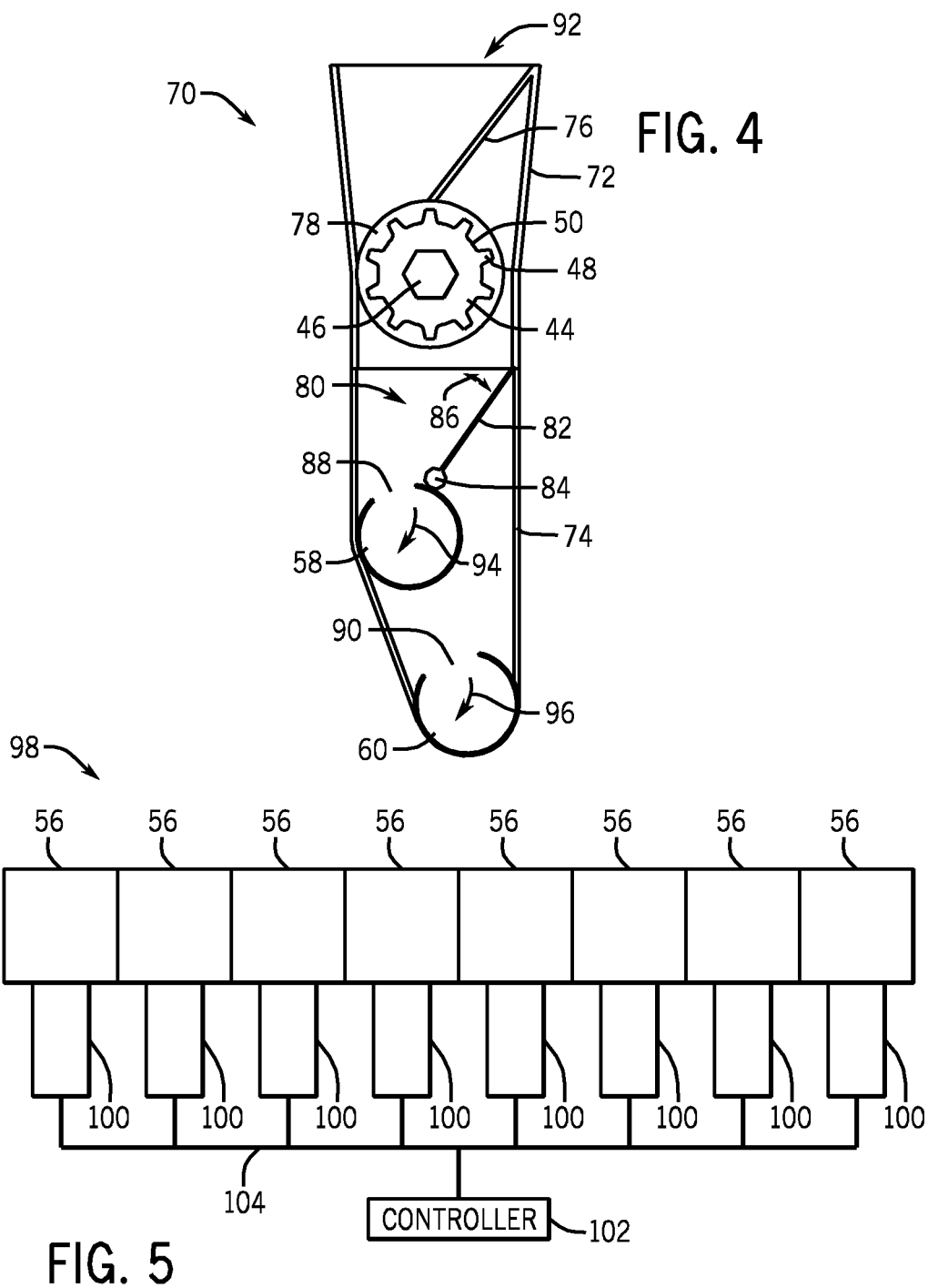

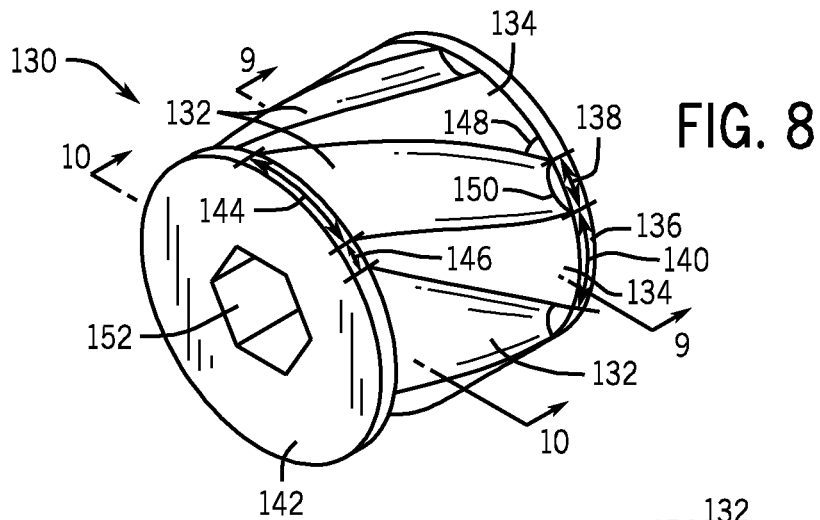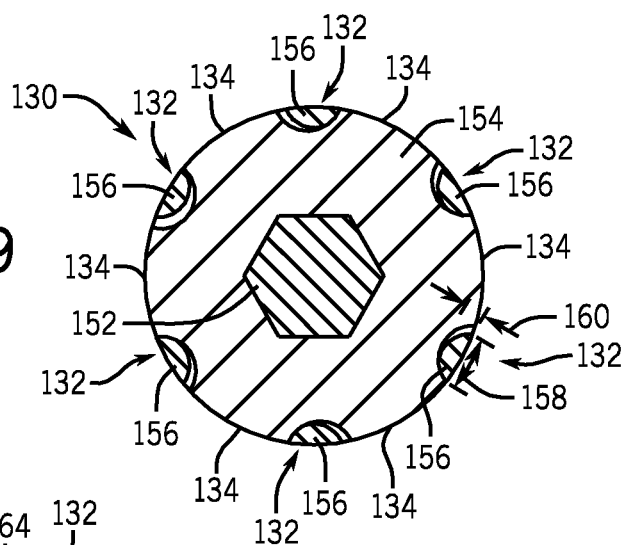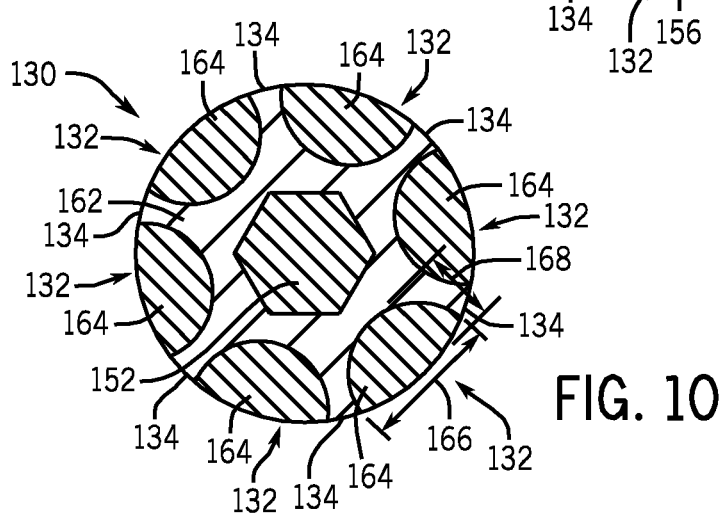

VARIABLE GEOMETRY METER ROLLER

CROSS REFERENCE TO RELATED APPLICATIONS

This application is a divisional of U.S. patent application Ser. No. 13/071,812, entitled "Variable Geometry Meter Roller", filed Mar. 25, 2011 which is a continuation of U.S. patent application Ser. No. 13/045,280, entitled "Variable Geometry Meter Roller", filed Mar. 10, 2011, which are both herein incorporated by reference in their entirety.

BACKGROUND

The invention relates generally to metering systems and, more particularly, to a metering device with variable geometry.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air cart is used to meter and deliver agricultural product (e.g., seeds, fertilizer, etc.) to ground engaging tools within the seeding implement. Certain air carts include a metering system and air conveyance system configured to deliver metered quantities of product into an airflow that transfers the product to the openers. However, the metering system may include meter rollers with a limited ability to control product flow. For example, some meter rollers may have a uniform geometric shape that does not compensate for a change in product size. With such meter rollers, an undesirable quantity of product may be metered and/or the cross sectional area of the flutes may be insufficient to meter product having large diameter particles. Thus, an operator will typically replace meter rollers when switching between products. Consequently, multiple assembly/disassembly steps may be involved, thereby decreasing productivity and increasing planting costs.

BRIEF DESCRIPTION

In one embodiment, an agricultural metering device includes a meter roller having a plurality of flutes. An aggregate cross sectional area of the flutes increases along a longitudinal axis of the meter roller.

In another embodiment, an agricultural metering device includes a meter roller having a plurality of ridges extending between a first longitudinal end of the meter roller and a second longitudinal end of the meter roller. The metering device also includes a plurality of flutes. Each flute is formed between a pair of adjacent ridges. The metering device includes a cross sectional area of each flute in a plane generally parallel to the first and second longitudinal ends which increases along a longitudinal axis of the meter roller.

In another embodiment, an agricultural metering device includes a meter roller. The meter roller includes a first longitudinal end, a second longitudinal end, and a longitudinal passage extending through the meter roller from the first longitudinal end to the second longitudinal end. The longitudinal passage is configured to receive a drive shaft. The meter roller also includes a plurality of flutes extending between the first and second longitudinal ends. A cross sectional area of each flute in a plane generally parallel to the first and second longitudinal ends increases along a longitudinal axis of the meter roller.

DRAWINGS

These and other features, aspects, and advantages of the present invention will become better understood when the following detailed description is read with reference to the accompanying drawings in which like characters represent like parts throughout the drawings, wherein:

FIG. 4 is a cross-sectional side view of a meter box of the metering system of FIG. 3;

FIG. 5 is a schematic diagram of another embodiment of a metering system;

FIG. 8 is a perspective view of an embodiment of a meter roller having variable geometry flutes;

FIG. 9 is a cross-sectional side view of the meter roller of FIG. 8, taken along line 9-9; and FIG. 10 is a cross-sectional side view of the meter roller of FIG. 8, taken along line 10-10.

DETAILED DESCRIPTION

Figure 1:
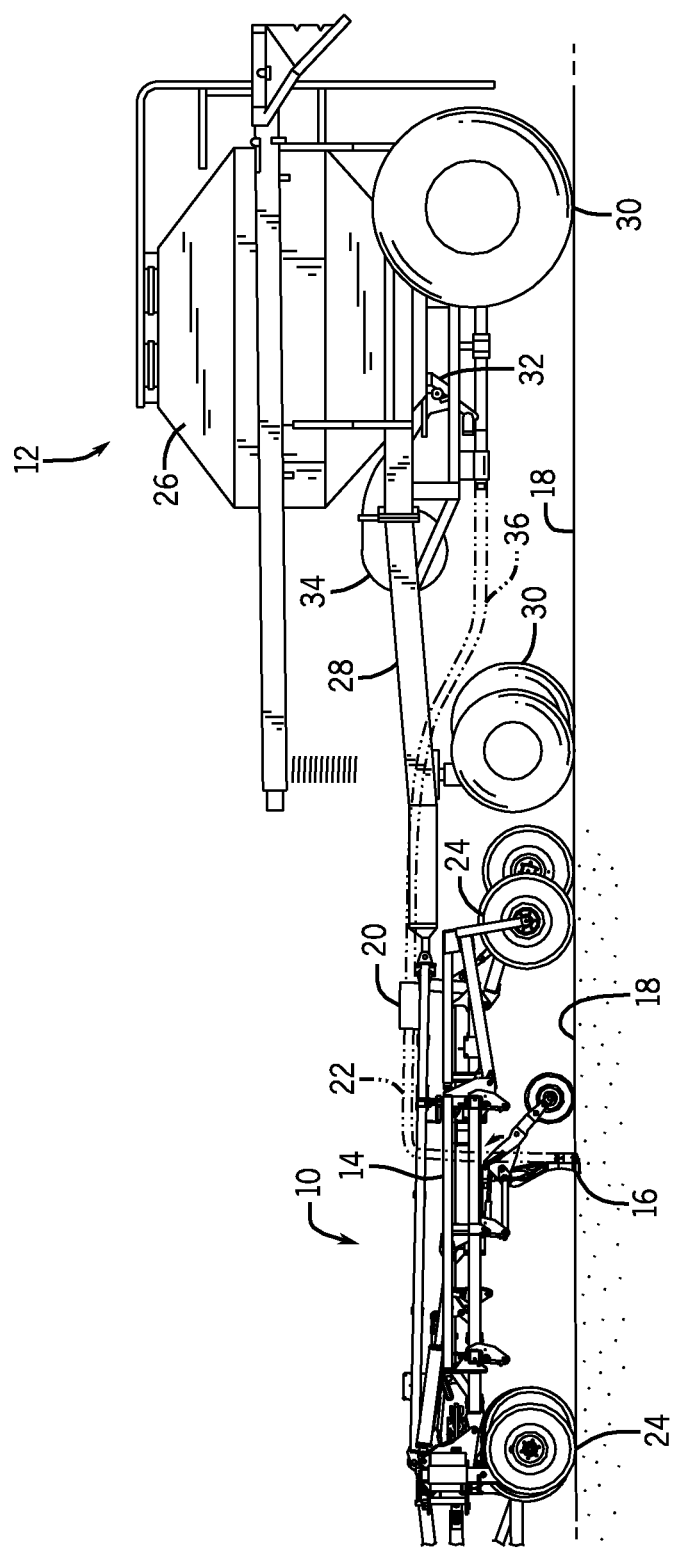
FIG. 1 is a side view of an air cart having a metering system that may utilize a variable geometry meter roller.

FIG. 1 is a side view of an air cart having a metering system that may utilize a variable geometry meter roller. In the illustrated embodiment, an implement 10 is coupled to an air cart 12 such that the air cart 12 towed behind the implement 10 during operation and transport. The implement 10 includes a tool frame 14 with a ground engaging tool 16. The ground engaging tool 16 is configured to excavate a trench into the soil 18 for seed and/or fertilizer deposition. In the illustrated embodiment, the ground engaging tool 16 receives product (e.g., seeds, fertilizer, etc.) from a product distribution header 20 via hose 22 extending between the header 20 and the ground engaging tool 16. Although only one ground engaging tool 16, product distribution header 20, and hose 22 are employed within the illustrated embodiment, it should be appreciated that the implement 10 may include additional tools 16, headers 20 and/or hoses 22 in alternative embodiments to facilitate product delivery to the soil 18. As illustrated, the implement 10 includes wheel assemblies 24 which contact the soil surface 18 and enable the implement 10 to be pulled by a tow vehicle.

As previously discussed, the air cart 12 is coupled to the implement 10, and towed behind the implement 10. As will be appreciated, in certain embodiments, the air cart 12 may be towed directly behind a tow vehicle, with the implement 10 towed behind the air cart 12. Likewise, the implement 10 and the air cart 12 may be part of a single unit, or the implement 10 and the air cart 12 may be separate units that are coupled together.

The air cart 12 includes a storage tank 26, a frame 28, wheels 30, a metering system 32, and an air source 34. The frame 28 includes a towing hitch configured to couple to the implement 10 or tow vehicle. In certain configurations, the storage tank 26 includes multiple compartments for storing various flowable particulate materials. For example, one compartment may include seeds, and another compartment may include a dry fertilizer. In such configurations, the air cart 12 may be configured to deliver both the seeds and fertilizer to the implement 10. Seeds and/or fertilizer within the storage tank 26 are gravity fed into the metering system 32.

In the present embodiment, the metering system 32 includes sectioned meter rollers to regulate the flow of material from the storage tank 26 into an air flow provided by the air source 34. The air flow then carries the material through a hose 36 to the implement 10, thereby supplying the ground engagement tool 16 with seeds and/or fertilizer for deposition within the soil. Although only one hose 36 is included in the illustrated embodiment, additional hoses may be may be employed in alternative embodiments to transfer product from the air cart 12 to the implement 10.

A control assembly may be communicatively coupled to the metering system 32 and the air source 34 to regulate flow of product to the implement 10. The control assembly may include a spatial locating device, such as a Global Positioning System (GPS) receiver. In such a configuration, the control assembly will receive geographical position information from the GPS receiver, thereby facilitating position determination of the air cart 12. As such, the control assembly may implement "Smart Farming" whereby the metering system 32 is controlled based on the geographical position of the metering system 32, air cart 12, and/or implement 10.

Figure 2:
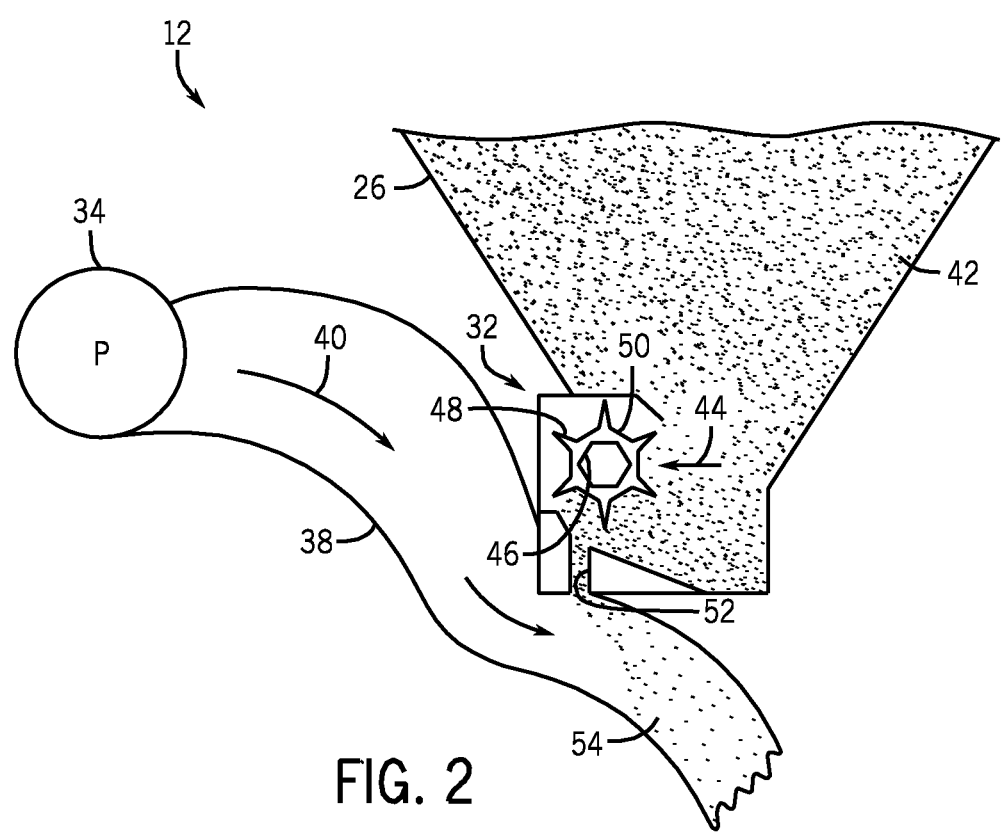
FIG. 2 is a schematic diagram of an exemplary metering system which may be employed within the air cart of FIG. 1.

FIG. 2 is a schematic diagram of exemplary metering system which may be employed within the air cart of FIG. 1. As illustrated, the air source 34 is coupled to a conduit 38 configured to enable air 40 to flow past the metering system 32. In other embodiments, the conduit 38 may include multiple conduit sections with one conduit section coupling the air source 34 to the top of the metering system 32 and another conduit section coupling the bottom of the metering system 32 to the implement. In such a configuration, air 40 flows through the metering system 32, from top to bottom. The air 40 enters the metering system 32, combines with the metered product, and exits the metering system 32 as a mixture of product and air.

The air source 34 may be a pump or blower powered by an electric or hydraulic motor, for example. Flowable particulate material 42 (e.g., seeds, fertilizer, etc.) within the storage tank 26 flows by gravity into the metering system 32. The metering system 32 includes a meter roller 44. However, in certain embodiments, more than one meter roller 44 may be configured to regulate the flow of material 42 into the air flow 40. In certain embodiments, the metering system 32 may include multiple meter rollers 44 disposed adjacent to one another along a longitudinal axis of the rollers 44, or in other embodiments, the meter rollers 44 may be positioned so their rotational axes are parallel to one another. For example, certain metering systems 32 include eight meter rollers 44 arrange in a linear configuration. Such systems 32 are known as "8-run" metering assemblies. However, alternative embodiments may include more or fewer meter rollers 44, e.g., 5, 6, 7, 8, 9, or more.

Each meter roller 44 includes an interior passage/cavity 46 configured to receive a shaft that drives the meter roller 44 to rotate. In the illustrated embodiment, the cavity 46 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 44. Alternatively, in certain embodiments, the meter rollers 44 may be coupled to a wheel by a gear assembly such that rotation of the wheel drives the meter rollers to rotate. Such a configuration will automatically vary the rotation rate of the meter rollers based on the speed of the air cart.

Each meter roller 44 also includes multiple ridges 48 and flutes 50. The number and geometry of the flutes 50 are particularly configured to accommodate the material 42 being distributed. The illustrated embodiment includes six flutes 50 and a corresponding number of ridges 48. Alternative embodiments may include more or fewer flutes 50 and/or ridges 48. For example, the meter roller 44 may include 2, 4, 6, 8, 10, 12, 14, 16, 18, 20, or more flutes 50 and/or ridges 48. In addition, the depth of the flutes 50 and/or the height of the ridges 48 are configured to accommodate the material 42 within the storage tank 26. For example, a meter roller 44 having deeper flutes 50 and fewer ridges 48 may be employed for larger seeds, while a meter roller 44 having shallower flutes 50 and more ridges 48 may be employed for smaller seeds. Other parameters such as flute pitch (i.e., rotation relative to a longitudinal axis) and flute angle (i.e., rotation relative to a radial axis) may also be varied in alternative embodiments. Furthermore, in certain embodiments, a meter roller 44 having variable geometry flutes 50 may be employed to accommodate a variety of seed sizes.

For a particular meter roller configuration, the rotation rate of the meter roller 44 controls the flow of material 42 into the air stream 40. Specifically, as the meter roller 44 rotates, material is transferred through an opening 52 in the metering system 32 into the conduit 38. The material then mixes with air from the air source 34, thereby forming an air/material mixture 54. The mixture then flows to the row units of the implement 10 via the pneumatic conduits, where the seeds and/or fertilizer are deposited within the soil. In the present embodiment, the metering system 32 may be deactivated by stopping rotation of the meter rollers 44, thereby substantially blocking the flow of material through the opening 52. Conversely, the metering system 32 may be activated by engaging rotation of the meter rollers 44. In this manner, product flow to the row units may be temporarily suspending while the ground engaging tools are in a non-working position or when product flow from a particular meter roller 44 is undesirable.

Figure 3:
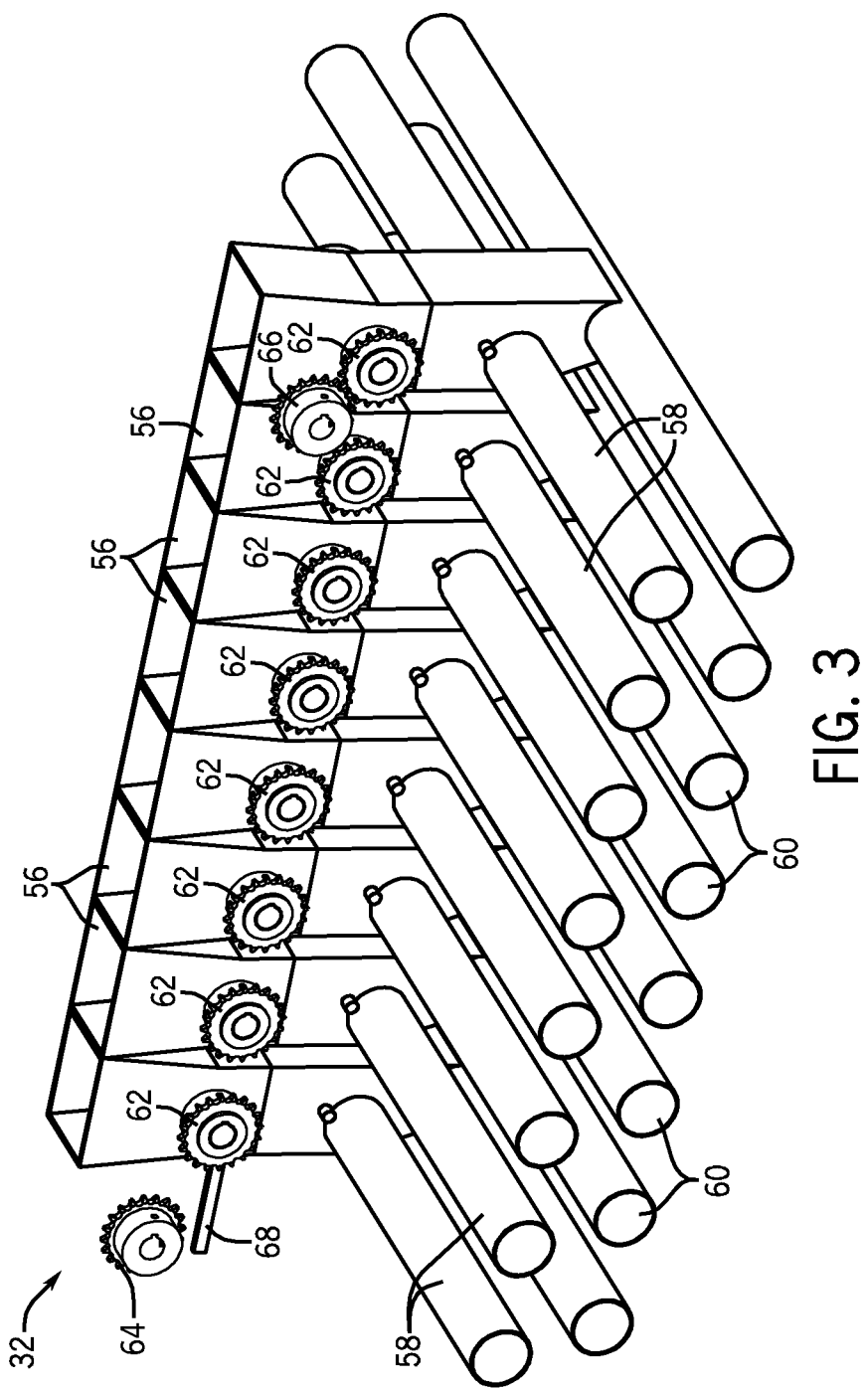
FIG. 3 is a perspective view of an embodiment of a metering system with meter rollers having a parallel rotational axis.

FIG. 3 is a perspective view of a metering system 32 with meter rollers having a parallel rotational axis. As illustrated, the metering system 32 includes multiple meter boxes 56 positioned adjacent to one another. In this embodiment, eight meter boxes 56 are included in the metering system 32. However, in other embodiments, 1, 2, 3, 4, 5, 6, 7, 8, 9, or more meter boxes 56 may be employed within the metering system 32. The meter boxes 56 enable product to flow directly to a meter roller (not shown) disposed inside each meter box. Furthermore, a primary distribution hose 58 and a secondary distribution hose 60 extend through each of the meter boxes 56 in a direction generally parallel to the rotational axes of the meter rollers. In alternative embodiments, the distribution hoses 58 and 60 may extend through the meter boxes 56 in a direction generally perpendicular to the rotational axes of the meter rollers.

The distribution hoses 58 and 60 facilitate product flow to the ground engaging tools. In addition, the distribution hoses 58 and 60 enable product to be combined or isolated before flowing to the ground engaging tools. For example, product from one or more meter boxes 56 may flow into the distribution hoses 58, while product from other meter boxes 56 may flow into the distribution hoses 60. In certain embodiments, product from a separate metering system may be delivered to the hoses 58 and/or 60 before the hoses receive product from the meter boxes 56. In this manner, multiple products may be combined within the hoses 58 and/or 60.

Each of the meter boxes 56 includes a sprocket 62 coupled to the meter roller (not shown). While substantially uniform sprockets 62 are employed in the illustrated embodiment, it should be noted that alternative embodiments may utilize sprockets that vary in size and/or number of teeth. As such, the rotational speed of each meter roller may be particularly adjusted by selecting a sprocket having a desired size and/or number of teeth. In the illustrated embodiment, the meter rollers are disposed inside the meter boxes 56 and are driven to rotate by the sprockets 62. Further, the meter rollers are positioned so that their rotational axes are parallel to one another.

In the illustrated embodiment, the metering system 32 includes a drive sprocket 64 and an idler sprocket 66. The drive sprocket 64, the idler sprocket 66, and the sprockets 62 include teeth configured to interface with a chain that drives the sprockets 62 to rotate, thereby rotating the meter rollers. However, it should be appreciated that a pulley/belt arrangement may be employed in alternative embodiments to drive the meter rollers to rotate. In certain embodiments, the chain may be routed from the drive sprocket 64 over the top of an adjacent sprocket 62, under the bottom of a subsequent sprocket 62, and then over the top of the next sprocket 62, and so on, along the length of the metering system 32. The chain may then extend across the top of the idler sprocket 66, and loop around to the drive sprocket 64. In such a configuration, when the drive sprocket 64 is driven to rotate by a drive unit, the chain will drive each sprocket 62 to rotate a respective meter roller. The drive unit may be stopped or started to cause each individual sprocket 62 to rotate. Further, a clutch, such as an electrical or a mechanical clutch, may be positioned between each sprocket 62 and a respective meter roller. The clutch may enable each meter roller to be selectively engaged or disengaged, thereby enabling individual control of each meter roller. Furthermore, the clutches may be configured to provide controlled slippage, thereby enabling the meter rollers to operate at varying speeds relative to one another.

Each of the meter boxes 56 includes a selection bar configured to enable product to be distributed into either distribution hose 58 or 60. Furthermore, a tube adjustment bar 68 extends out from the metering system 32 and is configured to control the position of the selection bars. For example, in one position, the tube adjustment bar 68 enables product metered in the meter boxes 56 to flow into the primary distribution hoses 58, while in another position, the tube adjustment bar 68 enables product metered in the meter boxes 56 to flow into the secondary distribution hoses 60.

FIG. 4 is a cross-sectional side view of a meter box 70 of the metering system of FIG. 3. The meter box 70 includes a roller section 72 and a distribution section 74. Product enters the roller section 72 and is directed toward the meter roller 44 via a sloped member 76. The meter roller 44 is positioned within an opening 78 in the meter box 70, and the meter roller 44 is secured in place and driven by a drive shaft inserted through the cavity 46. The drive shaft, in turn, is connected to the sprocket 62, thereby driving the meter roller 44 to rotate as the sprocket is driven by the chain.

The distribution section 74 includes a tube selection assembly 80 to determine whether product flows into the primary distribution hose 58 or the secondary distribution hose 60. The tube selection assembly 80 includes a selection bar 82 attached to a hinge 84. Furthermore, the hinge 84 is coupled to the adjustment bar so that movement of the adjustment bar drives the selection bar 82 to rotate in directions depicted by arrows 86. When the selection bar 82 is in the illustrated position, product from the meter roller 44 flows into the primary distribution hose 58 through an opening 88. When the selection bar 82 is rotated to the left such that the bar contacts the opposite side of the distribution section housing, product from the meter roller 44 will flow into the secondary distribution hose 60 through an opening 90. In certain embodiments, the selection bar 82 may be positioned in a central position between the sides of the distribution section housing to enable product to flow from the meter roller 44 into both the primary distribution hose 58 and the secondary distribution hose 60.

As illustrated by arrow 92, product enters the meter box 70 through the top of the roller section 72. The product is directed to the meter roller 44 via the sloped member 76. As the meter roller 44 rotates, product flows into the distribution section 74. Depending on the position of the tube selection assembly 80, product will flow to either or both of the distribution hoses 58 and 60. Product flowing into to the primary distribution hose 58 along the direction 94 may combine with any other product within the primary distribution hose 58, and the combined products will flow toward the implement. Likewise, product that flows into the secondary distribution hose 60 along the direction 96 may combine with any other product within the secondary distribution hose 60, and the combined products will flow toward the implement.

FIG. 5 is a schematic diagram of another embodiment of a metering system 98. As illustrated, a drive unit 100 is coupled to each meter box 56. The drive units 100 are configured to individually control the rotation of each meter roller. As will be appreciated, the drive units 100 may be any suitable device that may drive the meter rollers to rotate, such as an electric or hydraulic motor, for example. A controller 102 is coupled to the drive units 100 via a wiring assembly 104. The controller 102 is configured to send signals to the drive units 100 to selectively engage and disengage rotation of the meter rollers, and to control the speed of meter roller rotation. In such a configuration, the meter rollers may be individually controlled to enable selective meter roller rotation and speed control.

Figure 6:
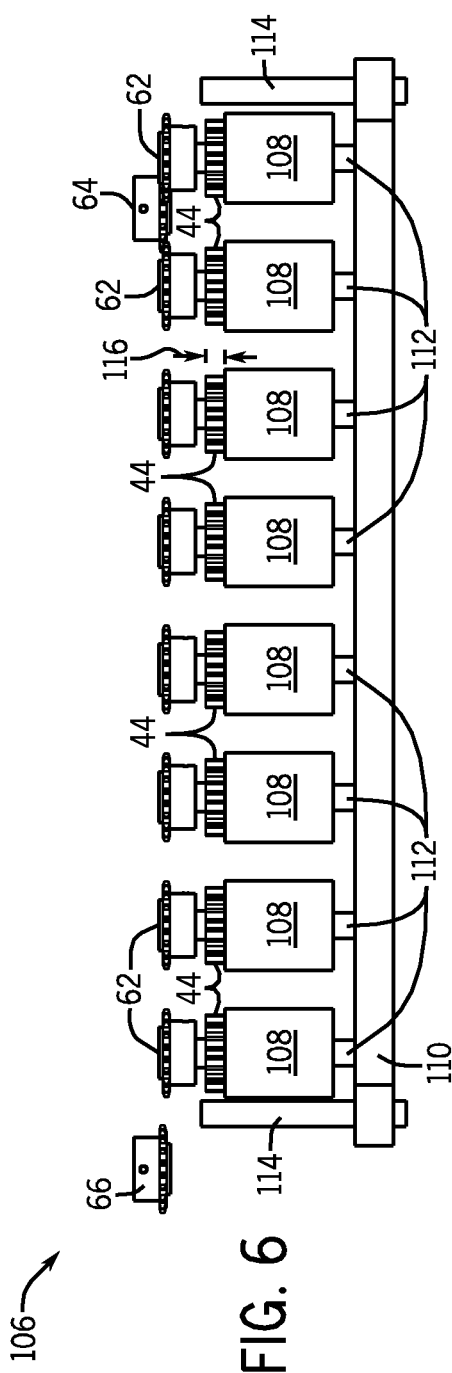
FIG. 6 is a top view of an embodiment of a metering system having a meter roller sleeve assembly.

FIG. 6 is a top view of an embodiment of a metering system having a meter roller sleeve assembly 106. In the illustrated embodiment, meter rollers 44 are disposed within meter roller sleeves 108. The meter roller sleeves 108 are cup shaped or cylindrical, and are configured to surround at least a portion the meter rollers 44. In certain embodiments, the meter roller sleeves 108 may be configured to surround an entire meter roller. As discussed in detail below, the meter roller sleeves 108 may assist in controlling the flow rate of product from the meter rollers 44. Furthermore, a sleeve adjustment bar 110 is coupled to each of the meter roller sleeves 108 via sleeve adjustment assemblies 112.

In addition, bar adaptors 114 are coupled to each end of the sleeve adjustment bar 110. The sleeve adjustment bar 110 and/or the bar adaptors 114 may be adjusted to cause the sleeves 108 to expose more or less of the surface area of the meter rollers 44. As more of the surface of the meter rollers 44 is exposed, a greater amount of product may be distributed by the meter rollers 44. Conversely, as less of the surface of the meter rollers 44 is exposed, a smaller amount of product may be distributed by the meter rollers 44. Thus, the amount of product distributed by the meter rollers 44 may be controlled by adjusting the position of the meter rollers sleeves 108. As depicted, the meter roller sleeves 108 expose a portion of the meter rollers 44 having a length 116.

As will be appreciated, certain products may be metered at a low rate, such as canola, for example. Consequently, meter rollers configured to dispense such products may be turned at a very slow rate. Unfortunately, hydraulic drive systems configured to rotate the meter rollers may "stall" if turned too slowly. However, in the illustrated embodiment, the sleeves 108 may cover a portion of the meter roller 44, thereby enabling the meter roller to rotate faster, while still metering the appropriate amount of product. The faster turn rate may substantially reduce or eliminate the possibility of stalling the hydraulic drive system. Other products, such as peas or fertilizer, may utilize a faster turn rate, so the meter roller sleeves 108 may be positioned to cover a smaller surface area of the meter roller 44. Furthermore, the position of the meter roller sleeves 108 may be adjusted, either alone or in conjunction with varying the rotational rate of the meter rollers 44, to control product flow rate through the metering system.

The meter roller sleeves 108 may enable a metering system to meter a variety of products with a single meter roller configuration, thereby obviating the process of exchanging meter rollers when switching products. For example, an operator may select a particular meter roller configuration (e.g., having a desired flute depth, number of flutes, etc.) to facilitate accurate metering of a particular product. The operator may then remove the current meter roller, and install a new meter roller having the desired properties. Due to the duration of the meter roller replacement process, the implement will spend less time in the field, thereby reducing seeding efficiency. In contrast, because the illustrated embodiment facilitates varying product flow rate by adjusting the position of the sleeves 108 and/or the speed of the meter rollers 44, a particular meter roller configuration may be utilized to meter a variety of products, thereby increasing the efficiency of seeding operations.

In addition to controlling the collective group of meter roller sleeves 108, individual meter roller sleeves 108 may be independently adjusted. For example, the sleeve adjustment assembly 112 of a particular meter roller sleeve 108 may be adjusted to cause the meter roller sleeve 108 to cover more or less of the corresponding meter roller 44 than the other meter roller sleeves 108. Specifically, each meter roller sleeve 108 may be adjusted by rotating the meter roller sleeve 108 about a threaded rod of the sleeve adjustment assembly 112, thereby extending or retracting the sleeve 108. Alternatively, the meter roller sleeve 108 may be adjusted by rotating an adjustment bolt of the sleeve adjustment assembly 112. Such fine tuning may be used to adjust product flow rate to particular groups of row units, thereby compensating for variations in the number of row units per group.

Figure 7:
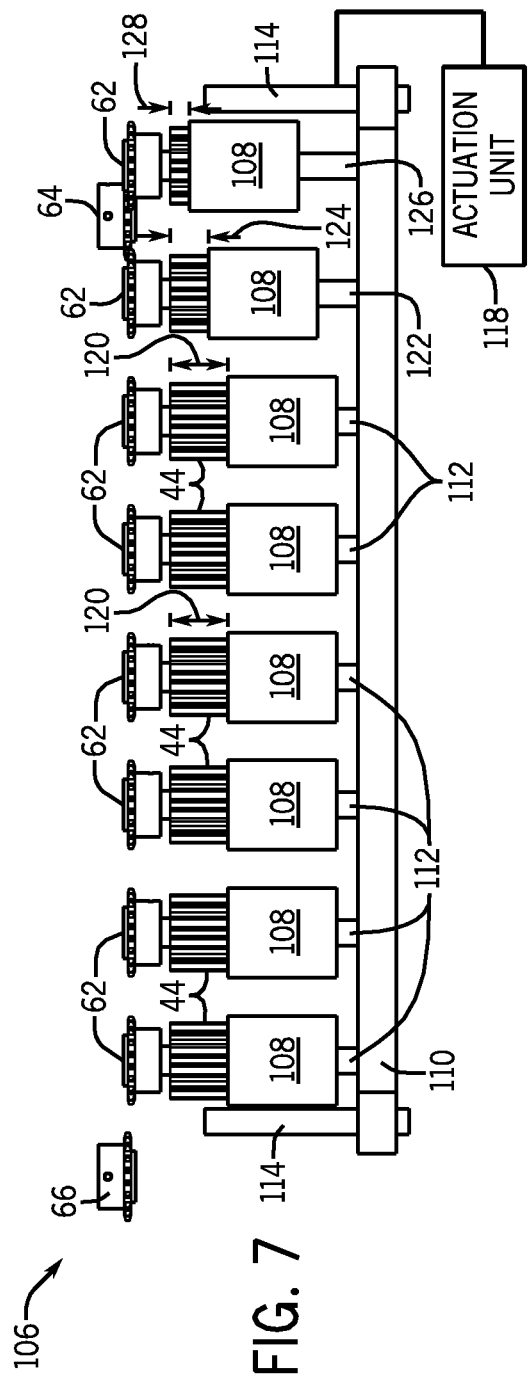
FIG. 7 is a top view of the meter roller sleeve assembly of FIG. 6, illustrating meter roller sleeve adjustment.

FIG. 7 is a top view of the meter roller sleeve assembly 106 of FIG. 6, illustrating meter roller sleeve adjustment. As illustrated, the sleeve adjustment bar 110 and/or the bar adaptors 114 are coupled to an actuation unit 118. The actuation unit 118 is configured to move the sleeve adjustment bar 110 and/or the bar adaptors 114 relative to the meter rollers 44. The actuation unit 118 may be operated via hydraulics, a solenoid, an electromechanical device, or any other type of suitable device configured to provide the desired actuation. Furthermore, the actuation unit 118 enables the meter roller sleeves 108 to be adjusted (i.e., moved back and forth) during operation, such as while planting or fertilizing a field. Specifically, the sleeve adjustment bar 110 may move to expose a length 120 of the meter rollers 44. As will be appreciated, the sleeve adjustment bar 110 may be moved automatically, such as via the actuation unit 118, or manually. When the sleeve adjustment bar 110 is moved, each of the sleeves 108 are moved with the bar 110.

Furthermore, the individual sleeves 108 may be adjusted such that different sleeves 108 cover different portions of the meter rollers 44. For example, one sleeve 108 may be adjusted via an adjustment assembly 122, thereby causing the sleeve 108 to expose a portion of the meter roller 44 having a length 124. As illustrated, the length 124 is smaller than the length 120. However, by adjusting the adjustment assembly 122 in an opposite direction, the length 124 may be greater than the length 120. Another adjustment assembly 126 may be adjusted to cause the sleeve 108 to expose a length 128 of the meter roller 44. The length 128 is smaller than the length 124 and the length 120. However, as previously discussed, the adjustment assembly 126 may be adjusted to cause the length 128 to be greater than the length 120 and/or the length 124. Further, any of the adjustment assemblies 112 may be adjusted to cause the sleeves 108 to cover a different portion of a respective meter roller 44. Such adjustments may be made manually, or via individual actuation units that may be attached to each meter roller sleeve 108 to individually fine tune the position of the meter roller sleeves 108. Each meter roller sleeve 108 may also be used to completely block product flow to a respective meter roller 44 by completely covering the meter roller 44. Such a complete product shut off may also be performed by either an actuator controlled or manual controlled arrangement.

As discussed in detail below, the meter roller sleeve assembly 106 may employ meter rollers 44 having variable geometry flutes. Such meter rollers 44 may provide increasing displacement along the length of the meter roller 44. Therefore, the product flow rate may vary non-linearly as the meter roller sleeve 108 covers varying portions of the meter roller 44.

FIG. 8 is a perspective view of a meter roller 130 having variable geometry flutes. The meter roller 130 includes alternating flutes 132 and ridges 134. As illustrated, an aggregate cross sectional area of the flutes increases along a longitudinal axis of the meter roller, thereby providing a meter roller having a displacement that varies with axial position. In the illustrated embodiment, each flute twists about the longitudinal axis as the flute extends between first and second longitudinal ends of the meter roller. At a first end 136, the flutes 132 have a width 138, while the ridges 134 have a width 140. Further, at a second end 142, the flutes 132 have a width 144, while the ridges 134 have a width 146. As illustrated, the width 138 of the flutes 132 at the first end 136 is smaller than the width 144 of the flutes 132 at the second end 142. Conversely, the width 140 of the ridges 134 at the first end 136 is greater than the width 146 of the ridges 134 at the second end 142.

In the illustrated embodiment, an angle 148 between the flutes 132 and the first end 136 is less than 90 degrees. However, it should be appreciated that in alternative embodiments, the angle 148 may be equal to or greater than 90 degrees. The flutes 132 have a generally arcuate profile, reaching a depth 150. However, in other embodiments, the flute profile may form other shapes, such as square, triangular, circular, etc. Thus, as illustrated, the meter roller 130 has flutes 132 that expand in width and depth as they extend from the first end 136 to the second end 142. Furthermore, the meter roller 130 has a longitudinal passage 152 extending between the ends 136 and 142. The passage 152 enables a drive shaft to be inserted therein to drive the meter roller 130. Although the opening 152 is depicted with a hexagonal shape, any other shapes may be used, such as triangular, square, pentagonal, etc., may be employed in alternative embodiments.

As will be appreciated, the illustrated meter roller 130 with variable geometry flutes may be combined with a meter roller sleeve as described previously. As such, the meter roller sleeve may enable only a portion of the meter roller 130 to meter product. In such a configuration, the meter roller may be adjusted to efficiently deliver various product sizes. Furthermore, a combination of a meter roller sleeve and the meter roller 130 may enable further control of metering properties, such as metering rates and operating rotations per minute.

FIG. 9 is a cross-sectional side view of the meter roller 130 of FIG. 8, taken along line 9-9. The meter roller 130 has a surface area 154 in a plane generally parallel to the first end. The surface area 154 is the area of the depicted circular cross-section that excludes the aggregate area of the flutes 132 (i.e., the collective sum of each individual area 156 of the flutes 132), and the area of the passage 152. Furthermore, the area 156 of each flute 132 has a width 158 and a depth 160. The depth 160 of each flute 132 varies across the width 158 to create a generally arcuate shape. It should be noted that the width of each ridge 134 is greater than the width 158 of each flute 132.

FIG. 10 is a cross-sectional side view of the meter roller 130 of FIG. 8, taken along line 10-10. The meter roller 130 has a surface area 162. The surface area 162 is the area of the depicted circular cross-section that excludes the aggregate area of the flutes 132 (i.e., the collective sum of each area 164 of the flutes 132), and the area of the passage 152. Furthermore, the area 164 of each flute 132 has a width 166 and a depth 168. The depth 168 of each flute 132 varies across the width 166 to create a generally arcuate shape. It should be noted that each of the ridges 134 has a smaller width than the width 166 of each flute 132.

As will be appreciated, the surface area 162 of the cross-section of FIG. 10 is smaller than the surface area 154 of the cross-section of FIG. 9. In addition, the cross-sectional surface area of the meter roller 130 continuously decreases from the first end to the second end of the meter roller 130. Furthermore, it is noted that the aggregate area of the flutes 132 (i.e., the collective sum of each individual area 164 of the flutes 132) of FIG. 10 is greater than the aggregate area of the flutes 132 of FIG. 9 (i.e., the collective sum of each individual area 156 of the flutes 132). As such, the cross-sectional aggregate area of the flutes 132 continuously increases from the first end to the second end of the meter roller 130. Furthermore, the width 166 and the depth 168 of each flute 132 in FIG. 10 is greater than the width 158 and the depth 160 of each flute 132 in FIG. 9. Thus, the width and the depth of the flutes 132 continuously increases from the first end to the second end of the meter roller 130.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural metering system, comprising:
a plurality of a meter rollers;
a corresponding plurality of meter roller sleeves, wherein each meter roller sleeve of the plurality of meter roller sleeves is disposed about a respective meter roller of the plurality of meter rollers, and each meter roller sleeve of the plurality of meter roller sleeves moves in operation relative to the respective meter roller to selectively cover a first portion of the respective meter roller during operation of the agricultural metering system and a second portion of the respective meter roller, larger than the first portion, during operation of the agricultural metering system; and
a control bar coupled to the plurality of meter roller sleeves, wherein the control bar collectively moves the plurality of meter roller sleeves in operation relative to the plurality of meter rollers.

2. The agricultural metering system of claim 1, wherein each meter roller sleeve of the plurality of meter roller sleeves is configured to move independently relative to the respective meter roller.

3. The agricultural metering system of claim 2, comprising an adjustment assembly extending between each meter roller sleeve of the plurality of meter roller sleeves and the control bar, wherein the adjustment assembly is configured to independently move each meter roller sleeve of the plurality of meter roller sleeves relative to the respective meter roller via rotation of the meter roller sleeve.

4. The agricultural metering system of claim 1, comprising an actuator coupled to the control bar, wherein the actuator is configured to drive the control bar to move the plurality of meter roller sleeves.

5. The agricultural metering system of claim 1, wherein each meter roller of the plurality of meter rollers is configured to provide a product flow rate that varies non-linearly as a function of coverage by a respective meter roller sleeve of the plurality of meter roller sleeves.

6. The agricultural metering system of claim 1, wherein each meter roller sleeve of the plurality of meter roller sleeves moves in operation relative to the respective meter roller along a longitudinal axis of the respective meter roller.

7. The agricultural metering system of claim 1, wherein at least one meter roller sleeve of the plurality of meter roller sleeves is disposed about an entire circumference of the respective meter roller.

8. An agricultural metering system, comprising:
a plurality of a meter rollers;
a corresponding plurality of meter roller covers, wherein each meter roller cover of the plurality of meter roller covers is disposed over at least part of a respective meter roller of the plurality of meter rollers, and each meter roller cover of the plurality of meter roller covers moves in operation relative to the respective meter roller to selectively cover a first portion of the respective meter roller during operation of the agricultural metering system and a second portion of the respective meter roller, larger than the first portion, during operation of the agricultural metering system; and
a control bar coupled to the plurality of meter roller covers, wherein the control bar collectively moves the plurality of meter roller covers in operation relative to the plurality of meter rollers.

9. The agricultural metering system of claim 8, wherein each meter roller cover of the plurality of meter roller covers is configured to move independently relative to the respective meter roller.

10. The agricultural metering system of claim 9, comprising an adjustment assembly coupled to each meter roller cover of the plurality of meter roller covers, wherein the adjustment assembly is configured to move each meter roller cover of the plurality of meter roller covers relative to the respective meter roller via rotation of the meter roller cover.

11. The agricultural metering system of claim 8, comprising an actuator coupled to the control bar, wherein the actuator is configured to drive the control bar to move the plurality of meter roller covers.

12. The agricultural metering system of claim 8, wherein each meter roller of the plurality of meter rollers is configured to provide a product flow rate that varies non-linearly as a function of coverage by a respective meter roller cover of the plurality of meter roller covers.

13. The agricultural metering system of claim 8, wherein each meter roller cover of the plurality of meter roller covers moves in operation along a longitudinal axis of the respective meter roller.

14. An agricultural metering system, comprising:
a first meter roller;
a first meter roller sleeve disposed about the first meter roller, wherein the first meter roller sleeve moves in operation relative to the first meter roller to selectively cover a first portion of the first meter roller during operation of the agricultural metering system and a second portion of the first meter roller, larger than the first portion of the first meter roller, during operation of the agricultural metering system; and
a control bar coupled to the first meter roller sleeve, wherein the control bar moves the first meter roller sleeve in operation relative to the first meter roller.

15. The agricultural metering system of claim 14, wherein the first meter roller sleeve moves in operation along a longitudinal axis of the first meter roller.

16. The agricultural metering system of claim 14, comprising a second meter roller and a second meter roller sleeve, wherein the second meter roller sleeve is disposed about the second meter roller, and the second meter roller sleeve moves in operation relative to the second meter roller to selectively cover a first portion of the second meter roller and a second portion of the second meter roller, larger than the first portion of the second meter roller; wherein the control bar is coupled to the second meter roller sleeve, and the control bar collectively moves the first and second meter roller sleeves in operation relative to the first and second meter rollers.

17. The agricultural metering system of claim 16, wherein the first meter roller sleeve moves in operation independently of the second meter roller sleeve relative to the first and second meter rollers.

18. The agricultural metering system of claim 17, comprising an adjustment assembly extending between the control bar and each meter roller sleeve of the first and second meter roller sleeves, wherein the adjustment assembly is configured to independently move the first meter roller sleeve relative to the first meter roller via rotation of the first meter roller sleeve, and the adjustment assembly is configured to independently move the second meter roller sleeve relative to the second meter roller via rotation of the second meter roller sleeve.

19. The agricultural metering system of claim 14, comprising an actuator coupled to the control bar, wherein the actuator is configured to drive the control bar to move the first meter roller sleeve.

20. The agricultural metering system of claim 14, wherein the first meter roller is configured to provide a product flow rate that varies non-linearly as a function of coverage by the first meter roller sleeve.

* * * * *